United States Patent
Hirose

(10) Patent No.: US 7,046,464 B2
(45) Date of Patent: May 16, 2006

(54) DATA RECORDING METHOD AND DATA RECORDING/REPRODUCING DEVICE, RECORDING MEDIUM

(75) Inventor: Toshiyuki Hirose, Tokyo (JP)

(73) Assignee: Sony Corporation, Tokyo (JP)

( * ) Notice: Subject to any disclaimer, the term of this patent is extended or adjusted under 35 U.S.C. 154(b) by 28 days.

(21) Appl. No.: 10/239,011

(22) PCT Filed: Jan. 18, 2002

(86) PCT No.: PCT/JP02/00354

§ 371 (c)(1), (2), (4) Date: Feb. 21, 2003

(87) PCT Pub. No.: WO02/058066

PCT Pub. Date: Jul. 25, 2002

(65) Prior Publication Data

US 2003/0151841 A1    Aug. 14, 2003

(51) Int. Cl.
*G11B 5/09* (2006.01)

(52) U.S. Cl. ............................. 360/48; 360/46; 360/53; 360/78.02; 360/72.2

(58) Field of Classification Search ................. 360/48, 360/53, 78.01, 47, 73, 63, 78
See application file for complete search history.

(56) References Cited

U.S. PATENT DOCUMENTS

| | | | | |
|---|---|---|---|---|
| 5,050,018 A | * | 9/1991 | Georgis et al. | 360/77.16 |
| 5,406,425 A | * | 4/1995 | Johnston et al. | 360/48 |
| 5,602,686 A | * | 2/1997 | Shih | 360/48 |
| 5,712,740 A | * | 1/1998 | Kikuchi et al. | 360/48 |
| 6,219,486 B1 | * | 4/2001 | Hoshi | 386/46 |
| 6,266,201 B1 | * | 7/2001 | Dahlerud et al. | 360/53 |

FOREIGN PATENT DOCUMENTS

| | | |
|---|---|---|
| EP | 0 821 359 | 1/1998 |
| JP | 6-131825 | 5/1994 |
| JP | 7-244934 | 9/1995 |
| JP | 2000-21093 | 1/2000 |
| WO | WO 00 23998 | 4/2000 |

* cited by examiner

*Primary Examiner*—David Hudspeth
*Assistant Examiner*—Dismery Mercedes
(74) *Attorney, Agent, or Firm*—Frommer Lawrence & Haug LLP; William S. Frommer; Thomas F. Presson

(57) ABSTRACT

The present invention provides a data recording method a data recording and/or reproducing apparatus for recording data transmitted from a computer to a magnetic tape. In case a recording head fails to write data (data ID=582) of fragment ID=5 to a track (track 7), then, the data is rewritten to the first fragment (ID=0) of a next track (track 8). Thus, the data can be rewritten not on the track basis but on the fragment basis, which can reduce loss of tape capacity significantly.

4 Claims, 6 Drawing Sheets

TRACK 7

| FRAGMENT ID | 0 | 1 | 2 | 3 | 4 | 5 | ····· | 94 | 95 |
|---|---|---|---|---|---|---|---|---|---|
| DATA ID | 577 | 578 | 579 | 580 | 581 | — | ····· | 671 | 672 |

TRACK 8

| FRAGMENT ID | 0 | 1 | 2 | 3 | 4 | 5 | ····· | 94 | 95 |
|---|---|---|---|---|---|---|---|---|---|
| DATA ID | 582 | 673 | 674 | 675 | 676 | 677 | ····· | 766 | 777 |

DATA RECORDING METHOD AND DATA RECORDING/REPRODUCING DEVICE, RECORDING MEDIUM

TECHNICAL FIELD

The present invention relates to a data recording method for recording data transmitted from a computer to a magnetic tape, etc., a data recording and/or reproducing apparatus, and a recording medium.

BACKGROUND ART

Conventionally, there is known the Digital Audio Tape (DAT) as a system for recording and reproducing digital data, in particular digital data of music, to and from a magnetic tape. Also, there is used the Digital Data Storage (DDS) as a system for recording and reproducing digital data of large capacity (several G bytes~scores of G Bytes) stored in a computer to and from a magnetic tape based on the DAT.

In the DDS, inclined tracks are recorded to a magnetic tape using a tape streamer of the helical scanning type having rotary heads. In each of the tracks, there are recorded 96 data blocks called fragments. In each of the fragments, a fragment ID to discriminate the respective fragments from others is recorded other than recording data.

In a recording and/or reproducing apparatus of the DDS, read after write (RAW) processing is performed to monitor whether or not fragments are normally recorded. In case a fragment is not normally recorded, rewrite processing is performed to rewrite a track including the fragment entirely to another position.

In the rewrite processing, even though there is raised only one fragment which is not normally recorded, a track including the fragment is rewritten entirely to another track. Also, since several tracks during a period from the time when a fragment which is not normally recorded is detected and until the time when the rewrite processing is performed are caused to be dummy, there is raised a problem that loss of tape capacity is enlarged.

DISCLOSURE OF THE INVENTION

Accordingly, the present invention has an object to overcome the above-mentioned drawbacks of the prior art by providing a data recording method, a data recording and/or reproducing apparatus, and a recording medium which can reduce loss of tape capacity to the utmost.

The above object can be attained by providing a data recording method for recording tracks each composed of a plurality of data blocks each containing recording data to a tape-shaped recording medium, wherein each of the data blocks has recorded therein a first identifier to identify the block in the track, and each of the data blocks has recorded therein a second identifier to identify the recording data recorded in the data block.

Also, the above object can be attained by providing a data recording and/or reproducing apparatus for recording tracks each composed of a plurality of data blocks each containing recording data to a tape-shaped recording medium, including:

means for recording a first identifier to identify the block in the track to each of the data blocks, and means for recording a second identifier to identify the recording data recorded in the data block to each of the data blocks.

Also, the above object can be attained by providing a recording medium of a tape shape which is to have recorded thereto tracks each composed of a plurality of data blocks each containing recording data, wherein each of the data blocks has a first area in which a first identifier to identify the block in the track is recorded, and a second area in which a second identifier to identify the recording data recorded in the data block.

Thus, according to the present invention, each of the data blocks has recorded therein the second identifier to identify the recording data recorded in the data block. So, data can be rewritten on the data block basis, which can reduce loss of tape capacity significantly as compared with the conventional manner.

These objects and other objects, features and advantages of the present invention will become more apparent from the following detailed description of the preferred embodiments of the present invention.

BEST MODE FOR CARRYING OUT THE INVENTION

The present invention will further be described below concerning the best modes with reference to the accompanying drawings.

Figure 1:
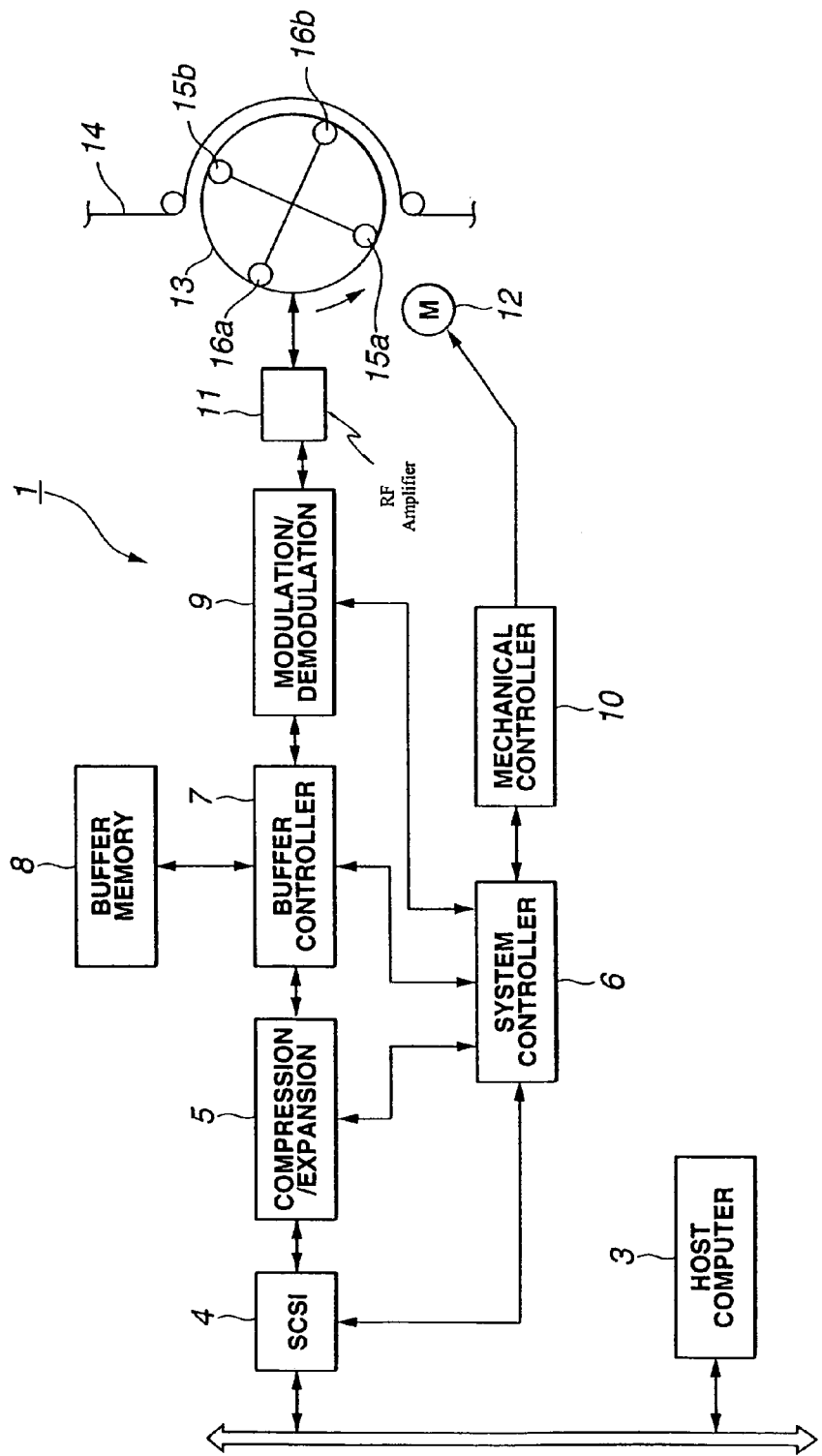
FIG. 1 shows a block diagram of a tape streamer drive employing the present invention.

FIG. 1 shows a block diagram of a tape streamer drive 1 employing the DDS recording system according to the present invention. The tape streamer drive 1 uses a tape cassette in which a magnetic tape of 8 mm in width is housed, and records and reproduces data to the magnetic tape in the helical scanning manner.

As shown FIG. 1, a rotary drum 13 has two recording heads 15a, 15b and two reproducing heads 16a, 16b arranged thereon. The rotary drum 13 has a magnetic tape 14 wound around the side thereof which is drawn from a tape cassette, and is caused to rotate by a drum motor 12. Also, the magnetic tape 14 is caused to run by a capstan motor and a pinch roller (not shown). The drum motor 12 is controlled by a mechanical controller 10 which performs drum servo processing, tracking servo processing, etc. The mechanical controller 10 is bidirectionally connected to a system controller 6 which controls the tape streamer drive 1 wholly.

Recording data to be recorded to the magnetic tape 14 is modulated by a modulation/demodulation circuit 9, and modulated data is supplied to the recording heads 15a, 15b via an RF amplifier 11. Then, the recording heads 15a, 15b write thus supplied data to the magnetic tape 14 forming inclination against the longitudinal direction of the magnetic tape 14. The recording heads 15a, 15b have azimuth angles different from each other. Thus, two tracks recorded by the recording heads 15a, 15b with inclination are of azimuth angles different from each other.

An SCSI interface 4 is used to send and receive data. In recording data to the magnetic tape 14, a host computer 3 sends data with its one record formed by 32 kilo bytes to a data compression/expansion circuit 5 via the SCSI interface 4.

The data compression/expansion circuit 5 performs compression and expansion of data using LZ codes. Using the LZ codes, repetition of input strings are detected to compress data. For example, specific codes are allocated to strings which are processed in the past, and are stored in a lexicon. Then, input strings are contrasted with the lexicon, and input strings which correspond to the lexicon are replaced with the lexicon codes, while the specific codes are allocated to input strings which do not correspond to the lexicon to be registered in the lexicon. Thus, data is compressed by registering input strings in a lexicon and replacing strings with lexicon codes.

In recording data to the magnetic tape 14, data from the host computer 3 is sent to the data compression/expansion circuit 5 via the SCSI interface 4. Then, the data compression/expansion circuit 5 compresses thus supplied data, and sends compressed data to a buffer controller 7. Then, the buffer controller 7 stores the compressed data in a buffer memory 8 temporarily. Data is recorded for each group. One group is made up of data of tracks of a predetermined number. Data corresponding to one block which is sent from the buffer memory 8 is supplied to the modulation/demodulation circuit 9. Then, the modulation/demodulation circuit 9 modulates the recording data, and sends modulated data to the recording heads 15a, 15b via the RF amplifier 11. Then, the recording heads 15a, 15b write the modulated data to the inclined tracks on the magnetic tape 14.

In reproducing data from the magnetic tape 14, the reproducing heads 16a, 16b read out data recorded on the magnetic tape 14, and send thus read out data to the modulation/demodulation circuit 9 via the RF amplifier 11. Then, the modulation/demodulation circuit 9 demodulates the read out data, and sends demodulated data to the buffer controller 7. Then, the buffer controller 7 stores the demodulated data in the buffer memory 8 temporarily. Data which is sent from the buffer memory 8 is supplied to the data compression/expansion circuit 5. Then, the data compression/expansion circuit 5 expands thus supplied data to restore original data. Then, the restored original data from the data compression/expansion circuit 5 is sent to the host computer 3 via the SCSI interface 4.

Figure 2:
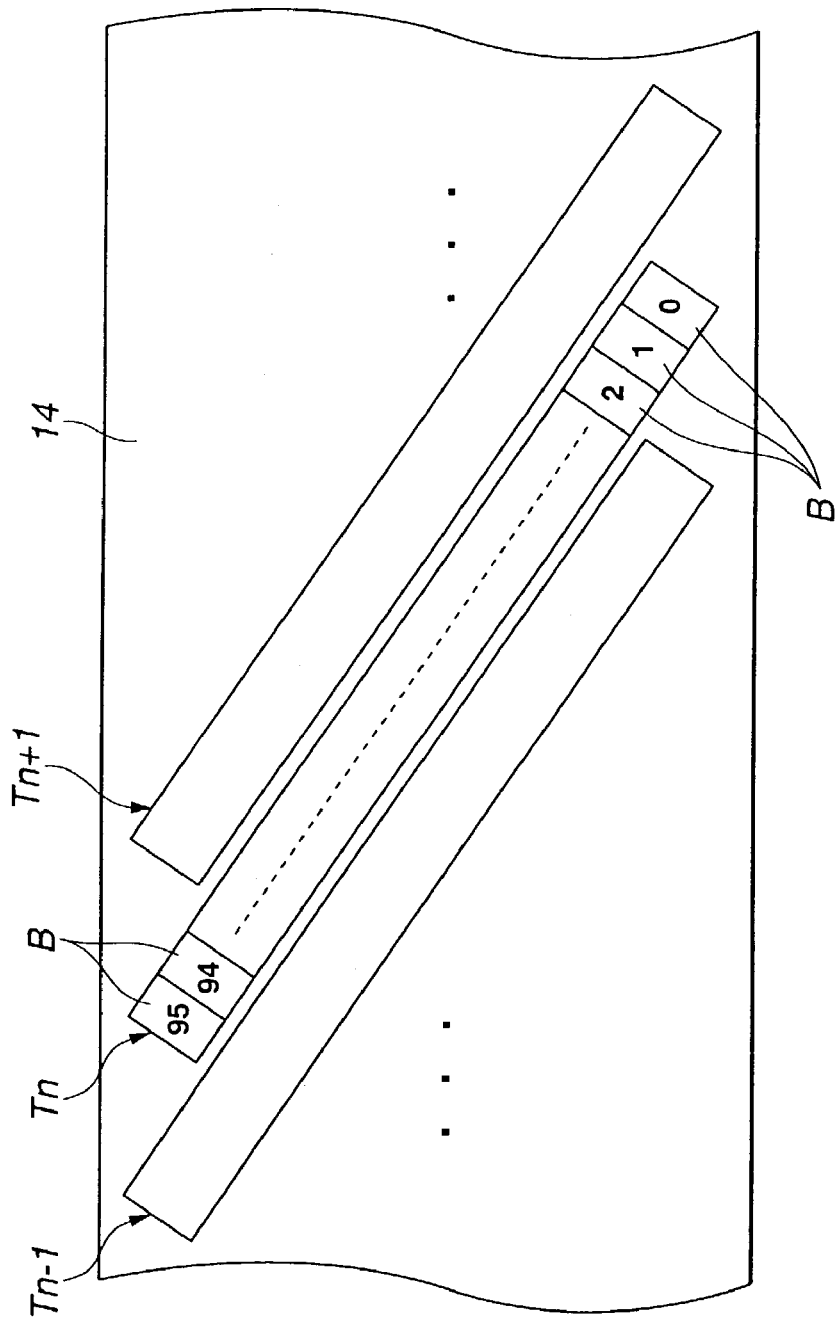
FIG. 2 shows a format on a magnetic tape in employing the tape streamer drive shown in FIG. 1.

FIG. 2 shows a format on the magnetic tape 14 in employing the tape streamer drive 1. There are arrayed 96 blocks B numbered from 0 to 95, each containing a fragment ID as an identifier, in an inclined track Tn which is recorded by one recording head.

Figure 3:
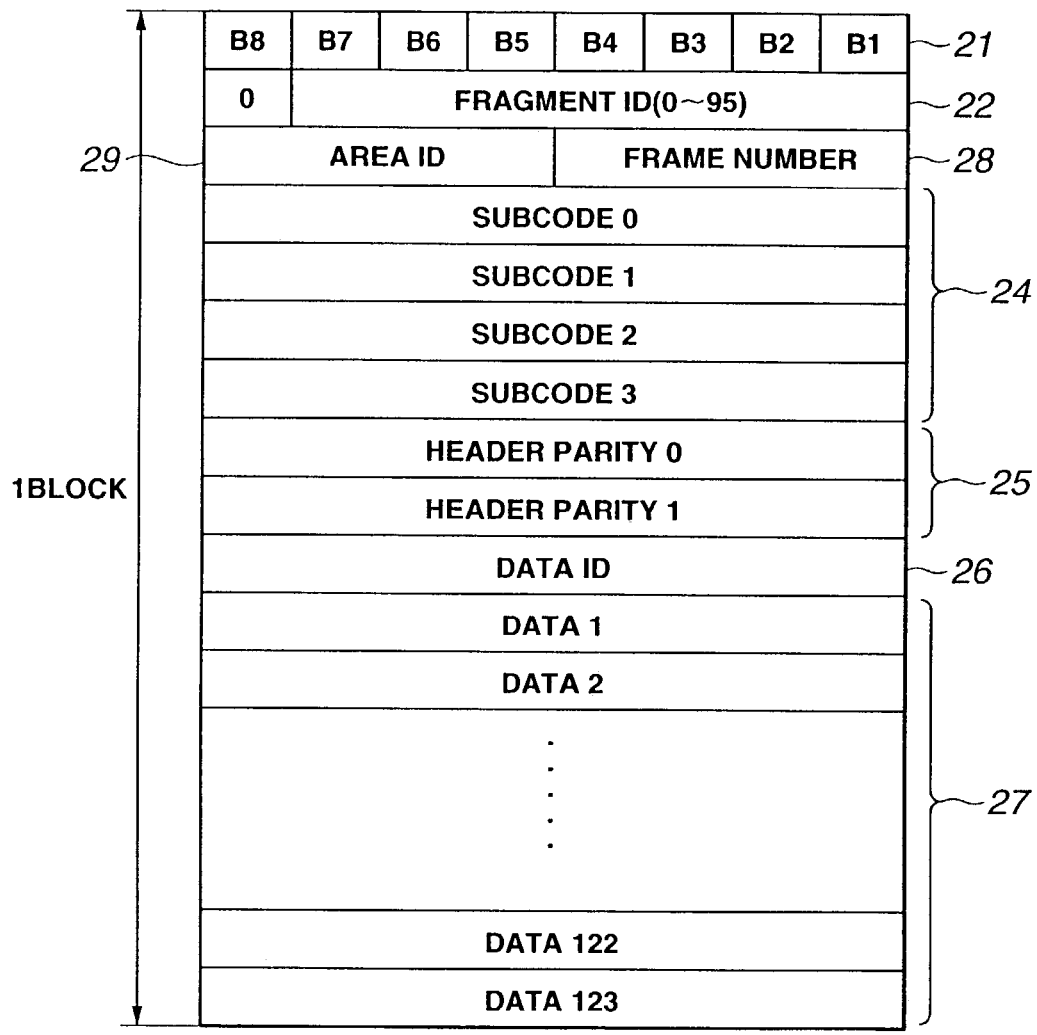
FIG. 3 shows a format of one block employing the present invention.

FIG. 3 shows a format of one block of the respective blocks shown in FIG. 2. As shown in the format, the block are composed of or divided into sync patterns 21, a fragment ID 22 as a first identifier, an area ID 29, a frame number 28, subcodes 24, header parities 25, a data ID 26 as a second identifier, and user data 27.

The sync patterns (B1~B8) 21 have recorded therein patterns for synchronously detecting the head of the fragment ID 22. The subcodes 24 have recorded therein data to which track numbers for search are attached. The user data 27 have recorded therein divided user data to which serial numbers from 0 to 123 are attached. The data ID 26 has recorded therein identifiers for identifying data recorded in the block to which a serial number beginning from 0 is attached. That is, for example, in case the fragment ID of the second track is 0 (first block), the data ID of the first block is 96. Also, in case the fragment ID of the seventh track is 5 (sixth block), the data ID of the sixth block is 582.

Next, the method for recording the data blocks shown in FIG. 2 and FIG. 3 will be explained.

Figure 4:
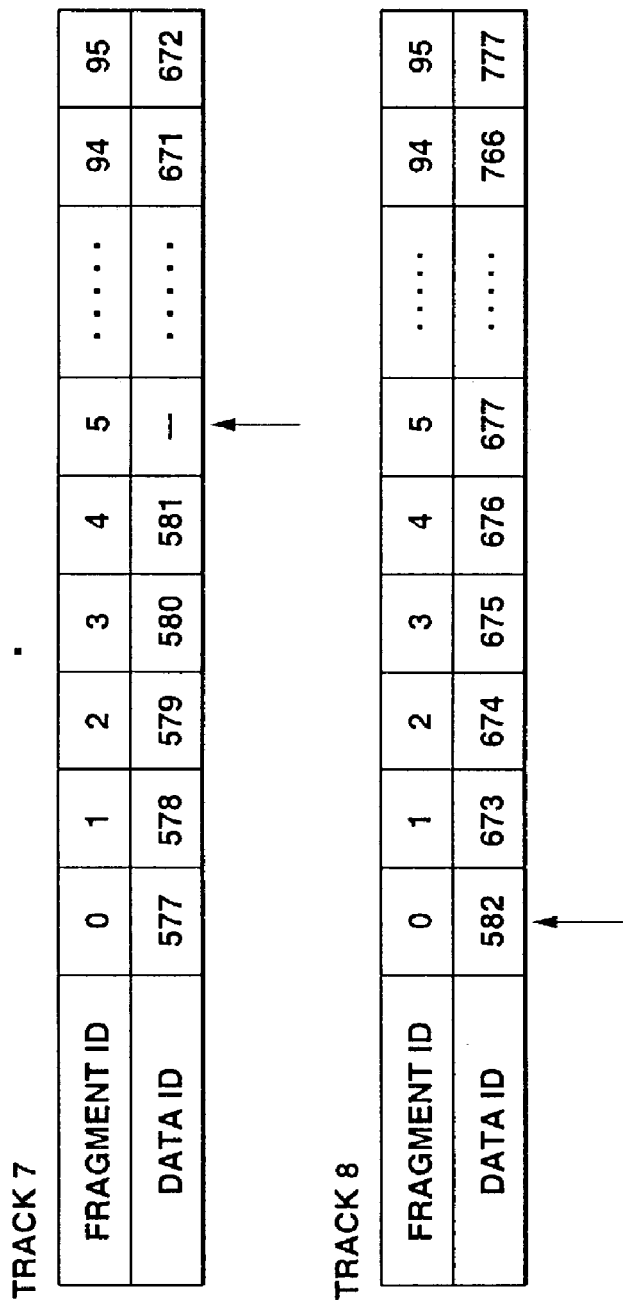
FIG. 4 shows the manner of the rewrite processing according to the present invention.

As shown in FIG. 1, data from the host computer 3 is sent to the buffer memory 8 via the SCSI interface 4 and the data compression/expansion circuit 5 to be temporarily stored therein. Then, thus stored data is sent to the recording heads 15a, 15b via the modulation/demodulation circuit 9 and the RF amplifier 11 under the control of the system controller 6 and the buffer controller 7. Then, the recording heads 15a, 15b write thus supplied data to the magnetic tape 14. At this time, the reproducing heads 16a, 16b, which rotate together with the recording heads 15a, 15b, read out the recorded data, and store thus read out data in the buffer memory 8 for performing parity check. The parity check may be performed, for example, every one track. Then, as shown in FIG. 4, in case the recording head 15a fails to write data of fragment ID=5 (data ID=582) to the seventh track (track 7), the failure is detected by the parity check. Then, the data is rewritten to the first fragment (ID=0) of the next eighth track (track 8). Thus, only the fragment of data ID=582 is rewritten, and rewriting of all the track is not necessary.

Next, the method for reproducing thus recorded data will be explained. For example, in case a direction of reproduction from fragment 0 to fragment 10 of the track 7 shown in FIG. 4 is sent from the host computer 3, among data of the track 7 and a track 8 which is read out by the reproducing heads 16a, 16b and stored in the buffer memory 8, data recorded in from fragment 0 to fragment 4 of the track 7, data recorded in fragment 0 of the track 8, and data recorded in from fragment 6 to fragment 10 of the track 7 is sent to the host computer 3 via the data compression/expansion circuit 5 and the SCSI interface 4 under the control of the system controller 6 and the buffer controller 7.

Figure 5:
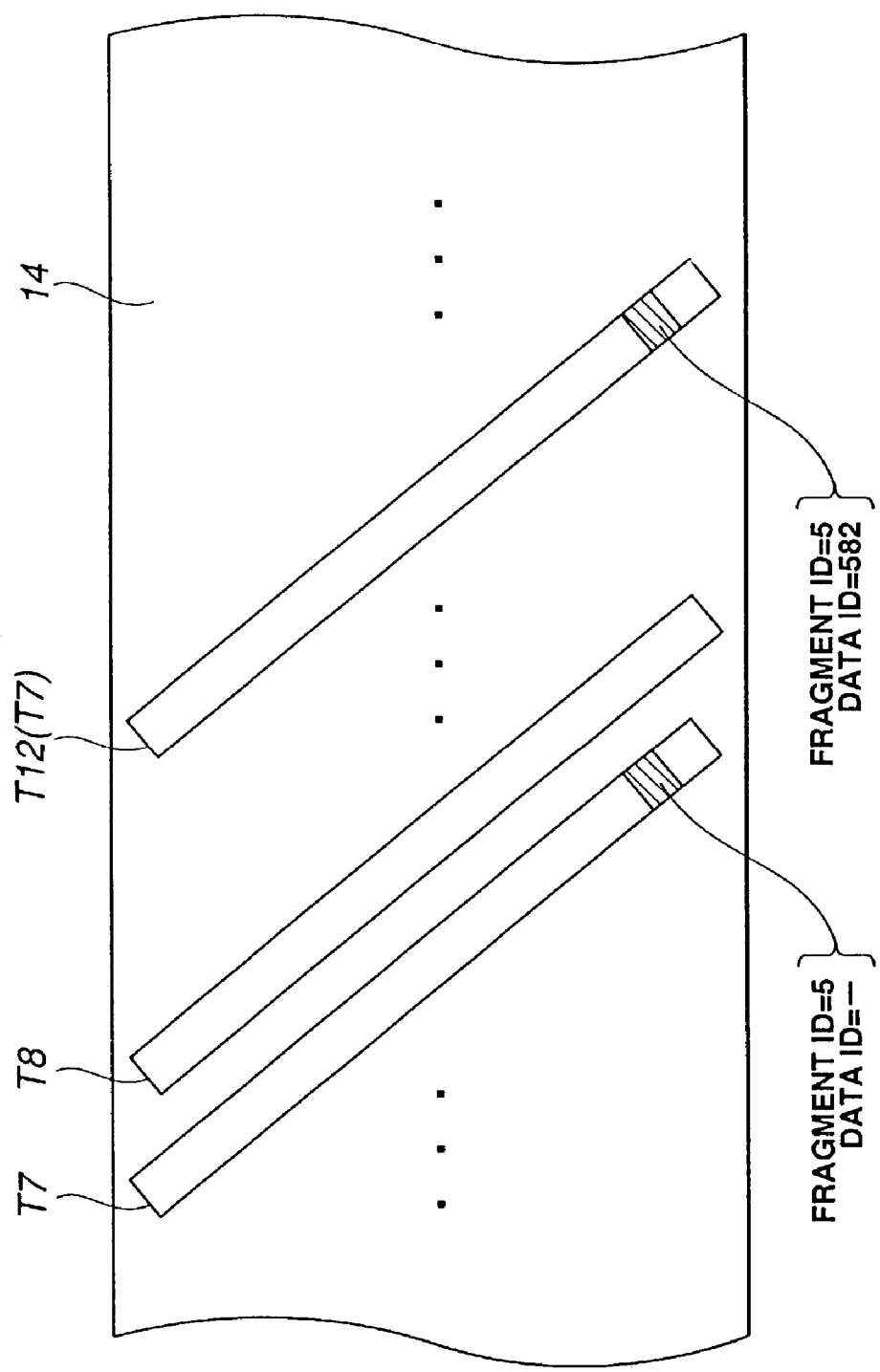
FIG. 5 shows the tracks after the rewrite processing of the conventional manner.

FIG. 5 shows rewriting of all the track in the conventional manner. As shown, even though only one fragment ID=5 of the track 7 is not normally recorded, the entire track T7 has to be recorded to a track 12, which is the fifth track from the track 7. Furthermore, since four tracks during a period from the time when the fragment which is not normally recorded is detected and until the time when the rewrite processing is performed are caused to be dummy, loss of tape capacity is enlarged.

Figure 6:
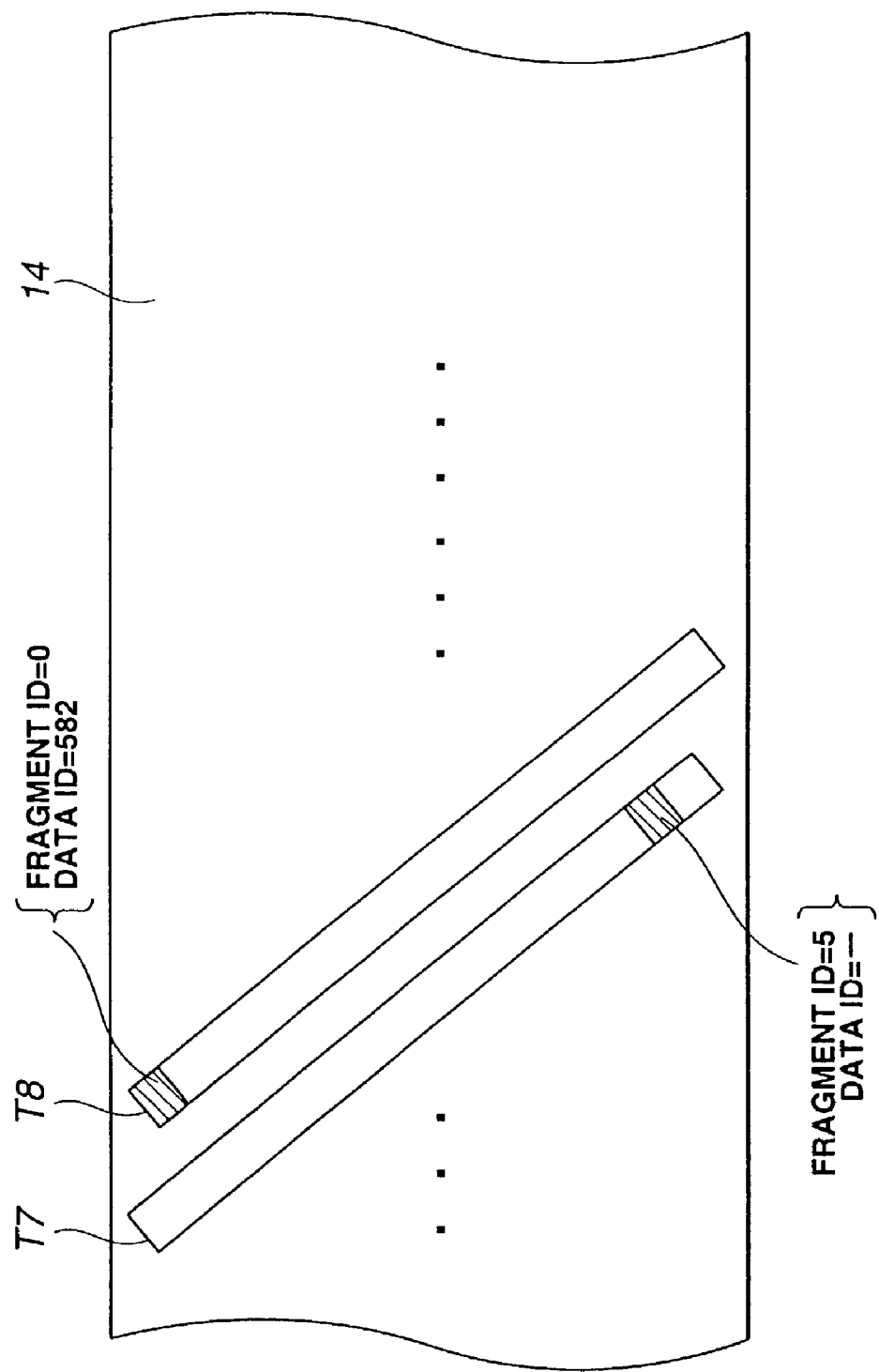
FIG. 6 shows the tracks after the rewrite processing according to the present invention.

On the other hand, in the embodiment according to the present intention, in case one fragment ID=5 of the track 7 is not normally recorded, data ID 582 is rewritten to the first fragment ID=0 of the eighth track T8, as shown in FIG. 6, which can significantly reduce loss of tape capacity.

INDUSTRIAL APPLICABILITY

As in the above, according to the present invention, data can be rewritten not on the track basis but on the fragment basis, which can reduce loss of tape capacity significantly.

What is claimed is:

1. A data recording and/or reproducing method for recording tracks each composed of a plurality of data blocks each containing recording data to a tape-shaped recording medium, comprising:

recording identifiers in the data blocks;

checking each of a plurality of tracks for an error in the recording of a data block; and rewriting the data block to a beginning portion of a track to be subsequently recorded when an error is detected, wherein each of the data blocks has recorded therein a first identifier to identify the block in the track, and each of the data blocks has recorded therein a second identifier to identify the recording data recorded in the data block.

2. The data recording method as set forth in claim 1, wherein the tape-shaped recording medium is a magnetic tape, and the tracks are recorded to the magnetic tape in the helical scanning manner.

3. A data recording and/or reproducing apparatus for recording tracks each composed of a plurality of data blocks each containing recording data to a tape-shaped recording medium, comprising:

means for recording a first identifier to identify the block in the track to each of the data blocks;

means for recording a second identifier to identify the recording data recorded in the data block to each of the data blocks;

means for reading after writing and for rewriting data; and means for checking each of a plurality of tracks for an error in the recording of the data blocks, wherein the data block is rewritten to a beginning portion of a track to be subsequently recorded when an error in the data block is detected.

4. The data recording and/or reproducing apparatus as set forth in claim 3, which has a rotary drum provided with recording and/or reproducing heads, wherein the tape-shaped recording medium is a magnetic tape, and the tracks are recorded to the magnetic tape in the helical scanning manner.

* * * * *